United States Patent [19]

Atwell

[11] 4,452,279
[45] Jun. 5, 1984

[54] SILICONE/ELASTOMER FIBERGLASS SLEEVES

[75] Inventor: William J. Atwell, Cromwell, Conn.

[73] Assignee: Titeflex Corporation, Springfield, Mass.

[21] Appl. No.: 349,012

[22] Filed: Feb. 16, 1982

[51] Int. Cl.³ .............................................. F16L 11/08
[52] U.S. Cl. ...................................... 138/126; 428/36; 428/188
[58] Field of Search ............... 138/123, 124, 125, 126; 428/36, 188, 398; 139/387 R; 156/149

[56] References Cited

U.S. PATENT DOCUMENTS

| | | | |
|---|---|---|---|
| 4,007,070 | 2/1977 | Busdiecker | 138/125 X |
| 4,190,088 | 2/1980 | Lalikos et al. | 428/36 X |
| 4,259,989 | 4/1981 | Lalikos et al. | 428/920 X |
| 4,259,991 | 4/1981 | Kutnyak | 138/125 X |
| 4,273,160 | 6/1981 | Lowles | 138/125 X |
| 4,276,908 | 7/1981 | Horne | 428/36 X |

FOREIGN PATENT DOCUMENTS

| | | | |
|---|---|---|---|
| 658988 | 3/1963 | Canada | 138/125 |
| 1081417 | 8/1967 | United Kingdom | 138/125 |

Primary Examiner—Henry F. Epstein
Attorney, Agent, or Firm—Louis Bernat

[57] ABSTRACT

A fire sleeve is made in the form of an elongated, flexible tube which may serve as a conduit for anything, such as wires, hydraulic lines, fuel hoses, air ducts, or the like. The fire sleeve has an elastomer jacket molded over an inner layer of braided yarn. Various molding techniques are used to improve the jacket-to-braid bonding. The fire sleeve will meet FAA tests wherein it must withstand the temperature of a burning aircraft for a fifteen-minute period before exposing the contents of the sleeve to the fire.

8 Claims, 5 Drawing Figures

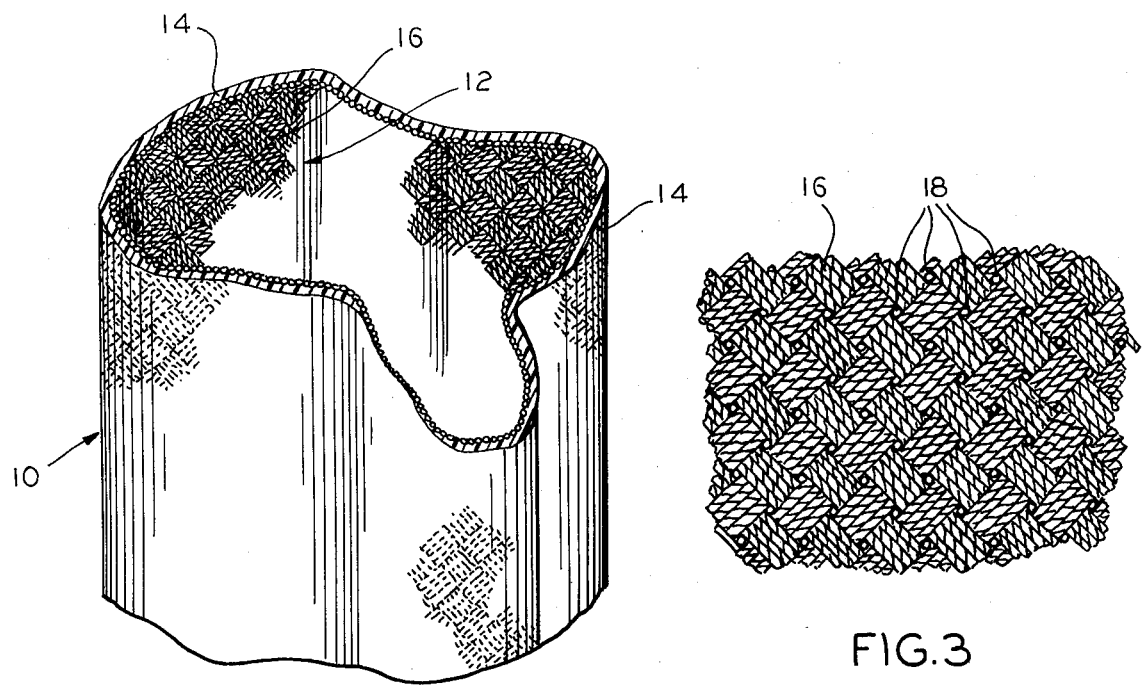
FIG.1
FIG.3
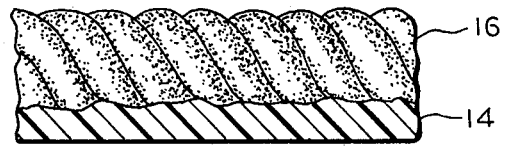
FIG.2
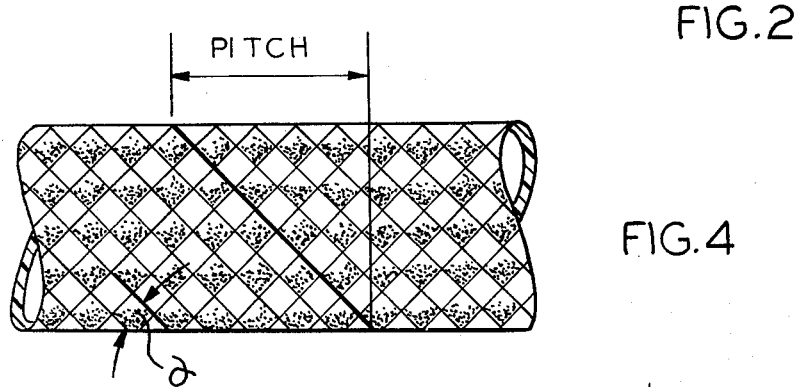
FIG.4
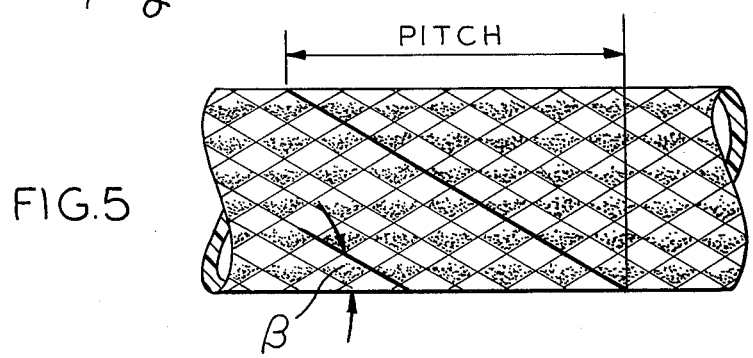
FIG.5

SILICONE/ELASTOMER FIBERGLASS SLEEVES

This invention relates to fire or insulating sleeve members which may provide a conduit for protecting any suitable structures, such as hoses, electric cables, or the like.

There are many examples of times, places and conditions where a fire or insulating sleeve member may be used as a conduit, such as to protect aircraft wiring, hydraulic lines, plumbing, steam ducts or the like. However, it is convenient to refer specifically to fire sleeves which meet the FAA standards that require certain devices to withstand the heat of a burning aircraft for a period of fifteen minutes before exposing the enclosed devices to the fire. For example, a fuel hose must not release fuel into a fire for the initial fifteen minutes of burning. Likewise, during that time, the fire sleeve must prevent anything which it covers from being exposed to an open flame. After fifteen minutes of elapsed time the standards of protection are substantially reduced and specifically it is no longer necessary to preclude the flame from reaching the covered device. These tests are generally in compliance with FAA TSO C 75 procedures.

When in a fire, the fire sleeve may or may not experience fire damage, perhaps charring and turning into refractory ash barrier, but it may not rupture. If the sleeve is so damaged by fire, that damage should remain localized at the point of the exposure to burning temperatures. The damage should not spread throughout the length of the sleeve.

Many devices of this general type are used as hoses (such as fuel hoses and hydraulic hoses) which enclose a combustible fluid and which must withstand the pressure or vacuum, as when such fluids are pumped to an engine of an aircraft. However, these devices are fairly rigid and do not easily shape themselves to any particular needs, as when serving as a conduit for electrical wiring, for example. Moreover, when the conduits are nearly filled with wires, for example, they do not readily expand or adapt themselves to accept any more wires. Thus, even though not absolutely full, it may not be possible to fish even one more wire through such a rigid conduit. Likewise, a rigid conduit does not lend itself to fitting around corners, through odd shaped areas, and the like. It is desirable for the inventive fire sleeve to be flexible and somewhat elastic so it may accommodate itself to any suitable shape, or to an odd free form configuration.

Accordingly, an object of the invention is to provide new and improved fire sleeves, having general utility for many uses. In this connection, an object is to provide fire sleeves for insulating hoses, electric cables, conduits and the like. An object is to provide enhanced insulation by creating widely distributed air pockets within the walls of the fire sleeve.

Another object of the invention is to provide mechanically superior, multilayer fire sleeves with better bonding between the component layers.

Yet another object is to provide a process for making a more acceptable fire sleeve.

In keeping with an aspect of the invention, these and other objects are accomplished by providing an essentially flexible and pliable fire sleeve or tube having inner and outer layers. The outer layer is a rubber or rubber-like elastomer jacket, or layer. The inner layer is preferably braided from a twisted fiberglass filament, which is bonded to the elastomer jacket layer. The fiberglass is made from filaments which are laid down with many air pockets which both improve insulation and provide interstices for allowing a deeper penetration of the flowable jacket elastomeric material which is in a plastic state during molding, with an improved mechanical bonding. The general principle of the invention is to maximize both the penetration of the flowable plastic material and the mechanical strength of the final sleeve.

A preferred embodiment of the inventitive tubular fire sleeve is seen in the attached drawing wherein:

FIG. 1 is a perspective view of the fire sleeve with an outer jacket and an inner layer or braid of twisted yarn;

FIG. 2 is a fragmentary cross section of a multi-ply braid of twisted yarn having an outer jacket molded thereto;

FIG. 3 is a plan view of a braided inner jacket showing how voids may form during the braiding process, to receive the flowable elastomer within the jacket during molding;

FIG. 4 shows a braid pattern with a braid angle of 45°; and

FIG. 5 shows a braid pattern with a preferred braid angle in the nature of 30°.

In FIG. 1, the fire sleeve 10 has an inner layer 12 and an outer layer 14. The inner layer 12 is a braid which preferably uses twisted and plied yarns 16 made of a plurality of continuous fiberglass filaments. However, it is also possible that sometimes a non-twisted yarn may be used. The outer elastomeric layer 14 is preferably a heat-cured silicone rubber jacket which is molded over the pre-formed braid of layer 12.

As can be plainly seen in FIG. 1, the walls of sleeve 10 are quite thin relative to the diameter of the opening so that the total sleeve has an extremely low flexural modulus which forms any suitable, randomly variable cross-sectional shape.

The yarn 16 is originally made in the form of texturized filaments, thereby creating distributed air pockets along the length of each strand, even in the yarn remains untwisted. The air pockets are inherent in texturized air-lofted yarns. These air pockets enhance the insulating qualities of the braid and provide interstices that enable a deeper penetration (FIG. 2) of the moltenelastomeric material of the outer jacket 14, thereby increasing the mechanical bonding strength. If a primer or adhesive promoting solution is used during manufacturing process steps, as the outer jacket is molded, there is an increase in the penetration of the elastomer into the interstices of the fiberglass.

By twisting multiple strands of the fiberglass filaments and subsequently plying the twisted strands, the multi-strand yarn has a diameter which is much larger than the diameter of the individual filaments. Since the braid is rather loosely made, still more interstices or voids are formed between overlapping layers of yarn, as seen at 18 in FIG. 3. Therefore, still more air pockets are formed to further enhance both the insulation and the mechanical bonding strength. Furthermore, since this manufacturing technique promotes a uniformly distributed bonding across the entire surface of the braid, any subsequent damage to the bonding is completely localized. Any fire damage is contained so that it does not spread into adjacent areas.

The braid angle controls the expansion characteristics of the fire sleeve. As shown in FIG. 4, the braid angle $\alpha$ is 45° and, as shown in FIG. 5, the braid angle $\alpha$ is in the range of 16°–45°. A braid angle of 30° is preferred. Other suitable braid angles may also be used, depending upon the desired or acceptable expansion.

The tightness of the braiding is also controlled to establish the amount of elastomeric penetration into the yarn. This may lead to a penetration of 5% -100%. After the elastomer is cured, the braided yarn is positively locked in place. One of the more important considerations is that, when subjected to fire, the dimensions of the fire sleeve should not change. For example, any substantial increase in diameter would likely be accompanied by a reduction in length, which might pull the sleeve end away from its anchor, such as an end fitting, for example.

The fire sleeve is not necessarily limited to the elastomeric silicone rubber-like compounds on the fiberglass yarns which have been described thus far. The silicone elastomers generally are prepared from a mixture of dimethyl silicone polymer, a filler and vulcanizing agent. Other silicone systems may use polyfunctional silane hydrides as cross linkers with vinyl-terminated polysiloxanes. Other suitable elastomeric jacket materials may be taken from a class including: chloroprene rubber compositions, ethylene-propylene-dieneterpolymer rubber compositions; polyurethane; epichlorohydrin rubber compositions, nitrile butadiene rubber, or other suitable elastomers, enumerated below. Other suitable yarns may be taken from a class including: polyesters, polyamides, and polyimides and combinations thereof.

The material used for the outer jacket may be selected on a bases of the following considerations.

chloroprene compositions have the advantage of greater resistance to most hydrocarbon fluids, but it is generally limited to temperatures from −40° F. (−40° C.) to 225° F. (107° C.) and it has less resistance to phosphate ester fluids;

ethylene-propylene-dieneterpolymer rubber compositions and ethylene propylene rubber compositions are generally limited to use within the temperature range of −65° F. (−54° C.) and 40020 F. (204° C.) and these compositions are less ozone and oxidation resistant than silicone;

epichlorohydrin rubber compositions have good resistance to hydrocarbon fluids but they have limited resistance to phosphate ester fluids and are generally limited to use within a temperature range of −40° F. (−40° C.) to 300° F. (149° C.);

butyl and chlorobutyl rubber compositions are limited to use within a temperature range of −40° F. (−40° C.) and 300° F. (149° C.) and they have a poor resistance to hydrocarbon fluids;

polyurethane rubber compositions have a useful temperature range of −40° F. (−40° C.) to 225° F. (107° C.), have good abrasion resistance, and are resistant to most fuels and lubricants;

nitrile butadiene rubber compositions may be used within the temperature range from −25° F. (−32° C.) to 250° F. (121° C.);

nylon thermoplastic compositions have a good abrasion, fuel, and lubricant resistance and they are generally limited to the temperature range of −40° F. (−40° C.) to 180° F. (82° C.);

polyester compositions have a temperature range from −95° F. (−71° C.) to 325° F. (163° C.) and have a good resistance to hydrocarbon fluids;

polyethylene compositions have an excellent chemical and fluid resistance and are limited to use within a temperature range of −65° F. (−54° C.) to 180° F. (82° C.); polypropylene has a superior chemical and fluid resistance and is limited to a temperature range of −40° F. (−40° C.) to 235° F. (113° C.).

The fire sleeve is fabricated on a mandrel in order to control its diameter most effectively. The manufacturing process begins with about 1600–2000 strands of individual, continuous fiberglass filaments which are twisted together to form a yarn. A specific structure consists of 1632 strands. Then, two or more of these yarns are plied together with a twist. Next, two or more of these plied yarns are plied together with a twist in the opposite direction.

The preferred yarn is 2 twisted, 4 turns/in. "S" direction/3 of these 3.8 turns/in. in "Z" direction, Owens-Corning ECDE 37 1/2/3.

Then, a number of the twisted yarns are braided together in any suitable manner, the braiding being done directly onto a mandrel. Or, alternatively, the braiding may be done freely, and then slipped over the mandrel. The preferred braid angles are within the range of 20° to 40° (and 30° specifically), and the braid pack density is preferably between 48% and 95% of the theoretical (and 89% specifically). (The term "braid pack" refers to the density of yarn in a side-by-side relationship. A 100% pack occurs when the yarn is in contiguous contact, with the yarn having a circular cross section. Since the yarn may be squeezed laterally into an oval cross section, the braid pack may be greater than 100%.)

A braid-covered mandrel is positioned to pass through a heated chamber to remove residual volatiles and to initiate reaction of an adhesion promotor, enhancing bonding characteristics; thence, directly into a heated cross head of a rubber of other elastomeric extruder. The head and die of the extruder are temperature controlled to reduce viscosity of the elastomer, resulting in greater penetration into the mandrel-supported braid.

If desired, an external pressure may be applied over the exterior of the jacket to drive in the rubber composition or other elastomers and insure 100% of the desired penetration of the yarn braid. During this manufacturing step, the inside diameter of the fire sleeve is set by the outside diameter of the mandrel. Immediately thereafter, the fire sleeve passes through a fluidized bed heated to about 400° F. (204° C.) in order to cure the bonded elastomer.

After the elastomer-jacketed sleeve is cured, a fluid pressure (e.g. air) is applied between the mandrel and the fire sleeve, to expand the fire sleeve and to provide an air bearing so that it may easily slip off the mandrel.

The material and design considerations may vary with the desired fire sleeve characteristics. The braid angles $\alpha$ and $\beta$ are shown in FIGS. 4 and 5 as being taken with respect to the longitudinal axis of the fire sleeve. The braid angle range is between 16°–53°, with a commercial practical range of 30°–45°. A specific application uses a braid angle range of 23°–42°. The braid is woven with a preferred braid pack destiny range of 58% to 88%, and a theoretical coverage range of 82% to 99%.

The braid may also have other additional strand materials included therewith.

Wire materials may be used in combination with the fiberglass strands or organic fibers in order to conduct heat or to provide stiffness to the fabricated braid.

It may sometimes be desirable to make the braid from untwisted yarn. Normally, the twist is preferred because it presents more filaments to the elastomer for bonding. Conversely, fewer individual fibers are exposed to the elastomer when the yarn is not twisted. Also, a yarn bundle will tend to flatten and eliminate braid interstices which would reduce elastomer penetration. A twisted yarn has more resilience and tends to tension and elongate more than untwisted yarn will tension and elongate. If either twisted or non-twisted fibers are used, it is desirable for the mandrel to be as large as possible, to insure a proper tensioning of the filaments during the bonding process.

Those who are skilled in the art will readily perceive how to further modify the invention; therefore, the appended claims are to be construed to cover all modifications falling within the true spirit and scope of the invention.

I claim:

1. A fire sleeve for use as a protective covering for another structure, the protective covering sleeve being completely separate from the other structure, said sleeve comprising a tubing with an extremely low flexural modulus which forms any suitable randomly variably cross-sectional shape so that sleeve easily slips over the other structure, said sleeve being composed of an outer elastomer jacket bonded to a braided inner layer of yarn, said inner laying being formed with air pockets and voids which enable the elastomer of said jacket to penetrate and bond into said air pockets and voids and to be more uniformly distributed over the surface of the yarn during a molding process.

2. The fire sleeve of claim 1 wherein said elastomer is taken from a group consisting of silicone elastomer, chloroprene, ethylene-propylene-dieneterpolymer rubber, polyurethane rubber, nitrile butadiene rubber, and epichlorohydrin rubber.

3. The fire sleeve of claim 1 wherein said yarn is taken from a group consisting of fiberglass, polyesters, polyamides and polyimides.

4. The fire sleeve of any of the claim 1-3 wherein the braid angle of said inner layer is in the range of 22° to 40°.

5. The fire sleeve of claim 4 wherein the braid pack of said inner layer is in the range of 58% to 86% of the theoretical 100% braid pack.

6. The fire sleeve of claim 4 wherein said yarn is made of air lofted, continuous filament fiberglass.

7. The fire sleeve of claim 6 wherein each yarn strand comprises a bundle of 1600-2000 of said filaments, formed as a double-ply twisted yarn.

8. The fire sleeve of claim 7 wherein there are approximately 1632 filaments in each strand of yarn, two of which strands are twisted together in one direction and subsequently three of these strands are twisted and plied together in the opposite direction.

* * * * *